(12) United States Patent
Park et al.

(10) Patent No.: US 6,430,156 B1
(45) Date of Patent: Aug. 6, 2002

(54) TRAFFIC CONTROL METHOD FOR PROVIDING PREDICTIVE GUARANTEED SERVICE

(75) Inventors: Jae-Hong Park; Shin-Hyun Yang; Se-Jong Oh; Woon-Hee Hwang, all of Seoul; Jin-Kyu Kwak, Kyonggi-do, all of (KR)

(73) Assignee: Hyundai Electronics Inds Co Ltd., Kyonggi-do (KR)

( * ) Notice: Subject to any disclaimer, the term of this patent is extended or adjusted under 35 U.S.C. 154(b) by 0 days.

(21) Appl. No.: 09/221,531

(22) Filed: Dec. 28, 1998

(30) Foreign Application Priority Data

Dec. 31, 1997 (KR) ............................................. 97-80905
Dec. 31, 1997 (KR) ............................................. 97-80906

(51) Int. Cl.$^7$ ................................................ H04L 12/50
(52) U.S. Cl. ......................................... 370/232; 370/360
(58) Field of Search ................................. 370/218, 230, 370/230.1, 235, 232, 250, 253, 360

(56) References Cited

U.S. PATENT DOCUMENTS 5,844,890 A * 12/1998 Delp et al. .................. 370/230
6,028,843 A * 2/2000 Delp et al. .................. 370/235
6,092,115 A * 7/2000 Choudhury et al. ........ 709/235
6,134,217 A * 10/2000 Stiliadis et al. ............ 370/232

* cited by examiner

Primary Examiner—Wellington Chin
Assistant Examiner—Brenda Pham
(74) Attorney, Agent, or Firm—J. Harold Nissen; Lackenbach Siegel

(57) ABSTRACT

A traffic control method for providing a guaranteed/predictive service which can guarantee a quality of service QOS by controlling transmission routes of various traffic data with a policing function using a moving ceiling MC function and a packet scheduling function using a first in first out FIFO or weighted fair queueing WFQ method, includes the steps of: observing an average transmission rate of packet data inputted through each route by using the MC method; determining whether the packet data satisfies passing conditions of the MC method by a result of the observation; storing the packet data in an output buffer when the packet data satisfies the passing conditions thereof; storing the packet data in an empty space of a certain storing unit, and abandoning the packet data when there is no empty space, in the case that the packet data does not satisfy the passing conditions of the MC method; and transmitting the packet data to a receiving side through a single transmission route after detecting the output buffer of each route by a scheduler of the FIFO/WFO method and multiplexing the packet data in an input order, whereby the predictive/guaranteed service is effectively supported, and the processing time of the packet data is reduced by using the MC method.

2 Claims, 4 Drawing Sheets

TRAFFIC CONTROL METHOD FOR PROVIDING PREDICTIVE GUARANTEED SERVICE

BACKGROUND OF THE INVENTION

1. Field of the Invention

The present invention is directed to a traffic control method for providing a predictive/guaranteed service which can be widely employed for an exchanger of various communication systems, such as ATM, PSTN and IMT-2000, and in particular to a traffic control method for efficiently controlling a predictive/guaranteed service which can guarantee a quality of service QOS by controlling a transmission route according to properties of various traffic data with a policing function using a moving ceiling MC function and a packet scheduling function using a first in first out FIFO or weighted fair queueing WFQ method.

2. Description of the Background Art

In general, multimedia traffics transmitted/received in a communication system include traffics requiring a real-time property and an existence property at the same time, such as a control signal and a signalling data, and multimedia traffics such as a video traffic and an audio traffic, in addition to simple data.

The above-mentioned traffics are all mingled and transmitted through a single physical transmission route, and thus it is necessary to develop a method for dividing and transmitting the traffics pursuant to their properties.

That is to say, different qualities of service QOS are required in relation to the multimedia traffics. Therefore, in order to effectively support the multimedia traffics, the transmission route should be properly controlled according to their properties, and then the traffics should be transmitted therethrough.

The multimedia traffics are divided into a guaranteed service, a predictive service and a best-effort service by a degree of the consumers' satisfaction.

Here, in the case of the guaranteed service, the quality of service QOS should be satisfactory by 100%. A control-related data which should not lose a data falls under the guaranteed service. In the case of the predictive service, when a data is partially lost or a time is delayed, it can be restored. The audio traffic and video traffic are classified into the predictive service. The best-effort service implies a case that the quality of service QOS is not guaranteed and a data transmission is through a residual bandwidth.

The guaranteed service is required to completely satisfy the quality of service QOS. Thus, in order to guarantee it, an worst-case analysis should be carried out in relation to the performance of supported functions, and resources should be sufficiently assigned according to a result of the analysis.

Here, the worst-case analysis is performed by presuming that the traffics are driven at the same time, namely that each traffic is concentrated on a peak rate.

In the case of the predictive service, it should be considered to guarantee the quality of service QOS and to efficiently use the resources. That is, a necessary quality of service should be guaranteed by efficiently using a small volume of resources. It is not preferable to completely guarantee the quality of service QOS by consuming a large volume of resources.

On the other hand, in order to support the predictive/guaranteed service, intermediate nodes on a network should perform various functions, such as routing, resource reservation, call admission control, packet scheduling and policing. The routing, resource reservation and call admission control functions are necessary before calls are set, and the packet scheduling and policing functions are employed while a packet data is transmitted after the calls are set.

The packet scheduling function serves to determine on which input route a packet to be-transmitted next is positioned by operating in packet units, and to intercept the other input routes. The packet scheduling function supports a packet-level isolation.

Here, the policing function serves to observe each route whether packets are transmitted according to properties described in a traffic describer, and to control the route which does not transmit the packets pursuant to the properties to abandon the packets.

A maximum transmission rate (interval between the packets) and an average transmission rate (a number of the packets averagely transmitted for a predetermined period) are mainly observed by the policing function. When observing the average transmission rate, the policing function determines after observation for a predetermined time, and supports a call-level isolation.

Here, the call-level isolation implies a case that, although one route transmission rate is temporarily increased, an average transmission rate of the other routes is not reduced. That is, the quality of service QOS is influenced not by a volume or pattern of packets transmitted through the other routes but by a volume or pattern of packets transmitted through its own route.

According to the conventional art, as illustrated in FIG. 1, a cell traffic control circuit and a method thereof (Patent Publication Gazette Heisei 8-79251) which was applied for registration on Aug. 30, 1994, includes: a cell detecting unit 12 for detecting an input of a cell on an input line, a kind of the inputted cell and a frame discriminator displayed on a corresponding cell; a traffic observing unit 16 computing a number of frames (n) which are being transmitted through an output line and a number of frames (m) which are being transmitted in a circuit by each band managing unit (w); a frame buffer unit 14 having a frame buffer with a plurality of sides for accumulating cells composing a corresponding frame in frame units when the frames are inputted over a predetermined maximum frame number; an empty frame buffer managing unit 15 for managing an empty frame buffer in the frame buffer unit 14; and a frame transmission control unit 13 for determining to accumulate the inputted cell in the frame buffer unit 14 or to transmit the cell through the output line. The frame transmission control unit 13 has a frame accumulation and registration table 13a with the frames which are being accumulated and a value of the band managing unit (w). When the band managing unit in which the inputted cell detected by the cell detecting unit 12 is included is registered on the frame accumulation and registration table 13a, the corresponding cell is accumulated in the frame buffer unit 14. When the cell is not registered thereon, if the corresponding inputted cell is an intermediate cell or final cell composing an information frame, the cell is transmitted to the output line. In the case that the cell is a first cell or single cell, it is determined by a predetermined determination rule whether the cell is transmitted to the output line or accumulated in the frame buffer unit 14.

According to the method for controlling the cell traffic, a number of the traffics which can be transmitted through the line is set to be a maximum frame number (N) which can be simultaneously transmitted. There are provided a unit for computing a number of the frames (n) which are being transmitted through the line and a buffer for accumulating the cells composing a corresponding frame when the frames are inputted over the maximum frame number. When the cell is a valid cell and a first cell or single cell composing the information frame, in case 'n' is smaller than 'N' (n<N) at the time of the cell arrival, a series of cells included in an identical frame to the corresponding cell are transmitted through the output line, and in case 'n' is equal to 'N' (n=N), a series of cells included in an identical frame to the corresponding cell are accumulated in the buffer discriminating the frame. In relation to the frame accumulated in the buffer, the cell traffic on the output line is controlled within a predetermined range by reading the cell from the buffer unit and transmitting it through the line within the range of 'n≦N' in the case that the input cell is not an invalid cell such as an empty cell, or the input cell is accumulated in the buffer and not transmitted through the output line.

The above-described conventional method relates to the policing function itself which abandons not the packets of the frames which starts to be transmitted but the packets of the frames which are not yet transmitted in the condition that the packets should be abandoned, in order to transmit the frames as many as possible under a given transmission bandwidth (average transmission rate).

According to the conventional art, both a case that many traffics are inputted and a case that few traffics are inputted are not considered and reflected to an window. That is to say, the conventional art merely to the case that many traffics are inputted.

In addition, there is another disadvantage of the conventional art in that it relates merely to the packet-level policing function in order to effectively carry out not the packet-level control but the frame-level transmission.

SUMMARY OF THE INVENTION

In order to overcome the disadvantages of the conventional art, the present invention serves to guarantee the quality of service QOS by using an policing function and a packet scheduling function.

It is therefore a primary object of the present invention to provide a traffic control method for providing a predictive service which can effectively control the predictive service by controlling transmission routes of various traffic data with a policing function using a moving ceiling MC method and a packet scheduling function using the first in first out FIFO method, in the condition that it is presumed that a proper amount of resources is assigned to calls.

It is another object of the present invention to provide a traffic control method for providing a guaranteed service which can effectively control the guaranteed service by controlling transmission routes of various traffic data with a policing function using a moving ceiling MC method and a packet scheduling function using an weighted fair queueing method WFQ, in the condition that it is presumed that calls are set to have a sufficient volume of resources.

In order to achieve the primary object of the present invention, there is provided a traffic control method for providing the predictive service, including the steps of: observing an average transmission rate of packet data inputted through each route by using the MC method; determining whether the packet data satisfies passing conditions of the MC method by a result of the observation; storing the packet data in an output buffer when the packet data satisfies the passing conditions thereof; storing the packet data in an empty space of a certain storing unit or abandoning the packet data when there is no empty space, in the case that the packet data does not satisfy the passing conditions of the MC method; and transmitting the packet data to a receiving side through a single transmission route after detecting the output buffers of each route by a scheduler of the FIFO method and multiplexing the packet data in an input order.

In order to achieve another object of the present invention, there is provided a traffic control method for providing the guaranteed service, including the steps of: observing an average transmission rate of packet data inputted through each route by using the MC method; determining whether the packet data satisfies passing conditions of the MC method by a result of observation; carrying out a packet scheduling on the packet data on each route according to the WFQ method when the packet data satisfies the passing conditions thereof; storing the packet data in an empty space of a certain storing unit or abandoning the packet data when there is no empty space, in the case that the packet data does not satisfy the passing conditions; determining whether the packet can be currently serviced pursuant to weight conditions provided to each input route by the WFQ method; multiplexing and transmitting the packet data to a receiving side through a single transmission route when the packet can be currently serviced; and carrying out the packet scheduling on the packet data according to the WFQ method when the packet cannot be currently serviced.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A traffic control method for providing a predictive/guaranteed service according to the present invention will now be described in detail with reference to the accompanying drawings.

Figure 1:
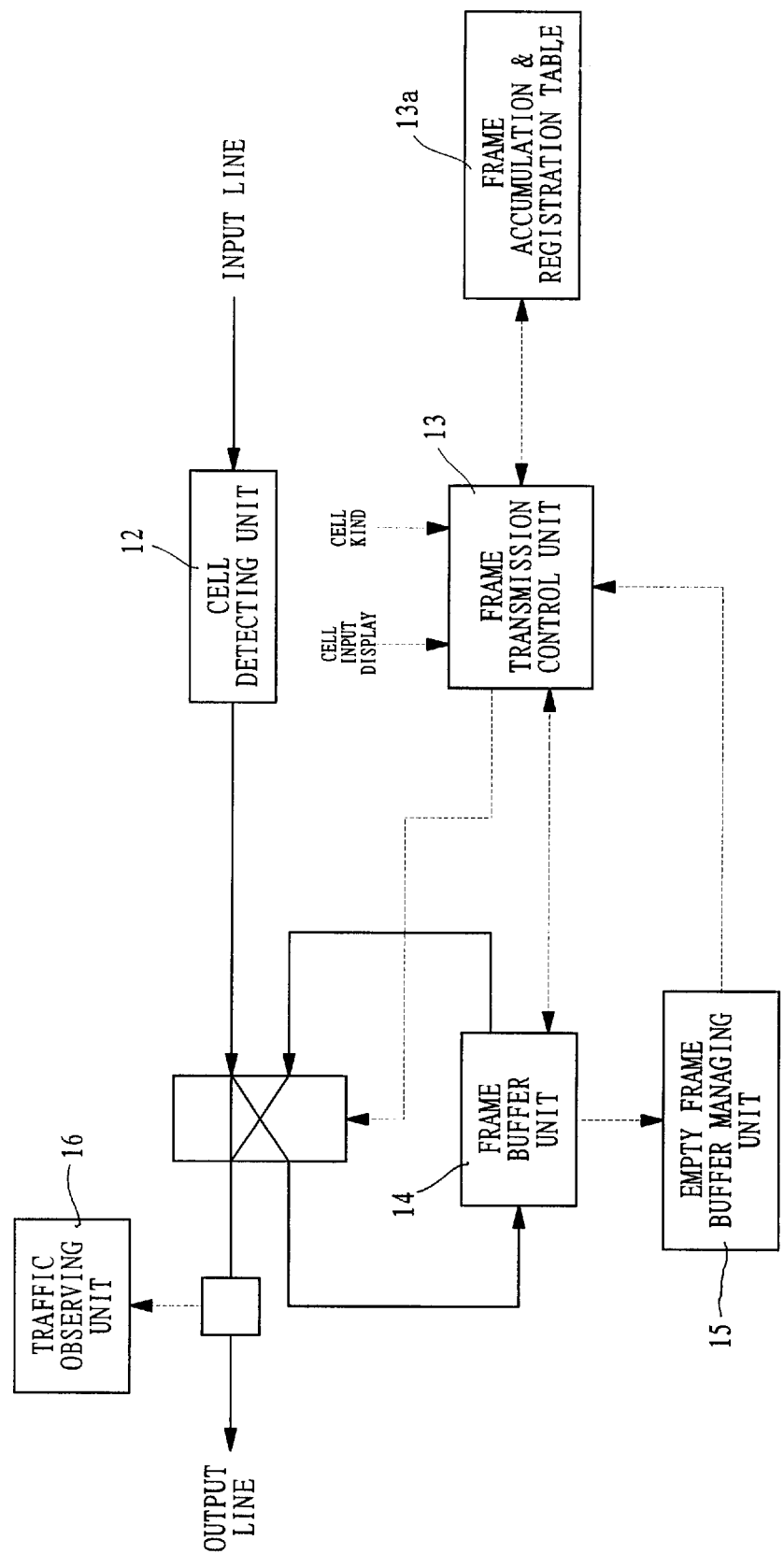
FIG. 1 is a block diagram illustrating a structure for performing a conventional cell traffic control.
Figure 2:
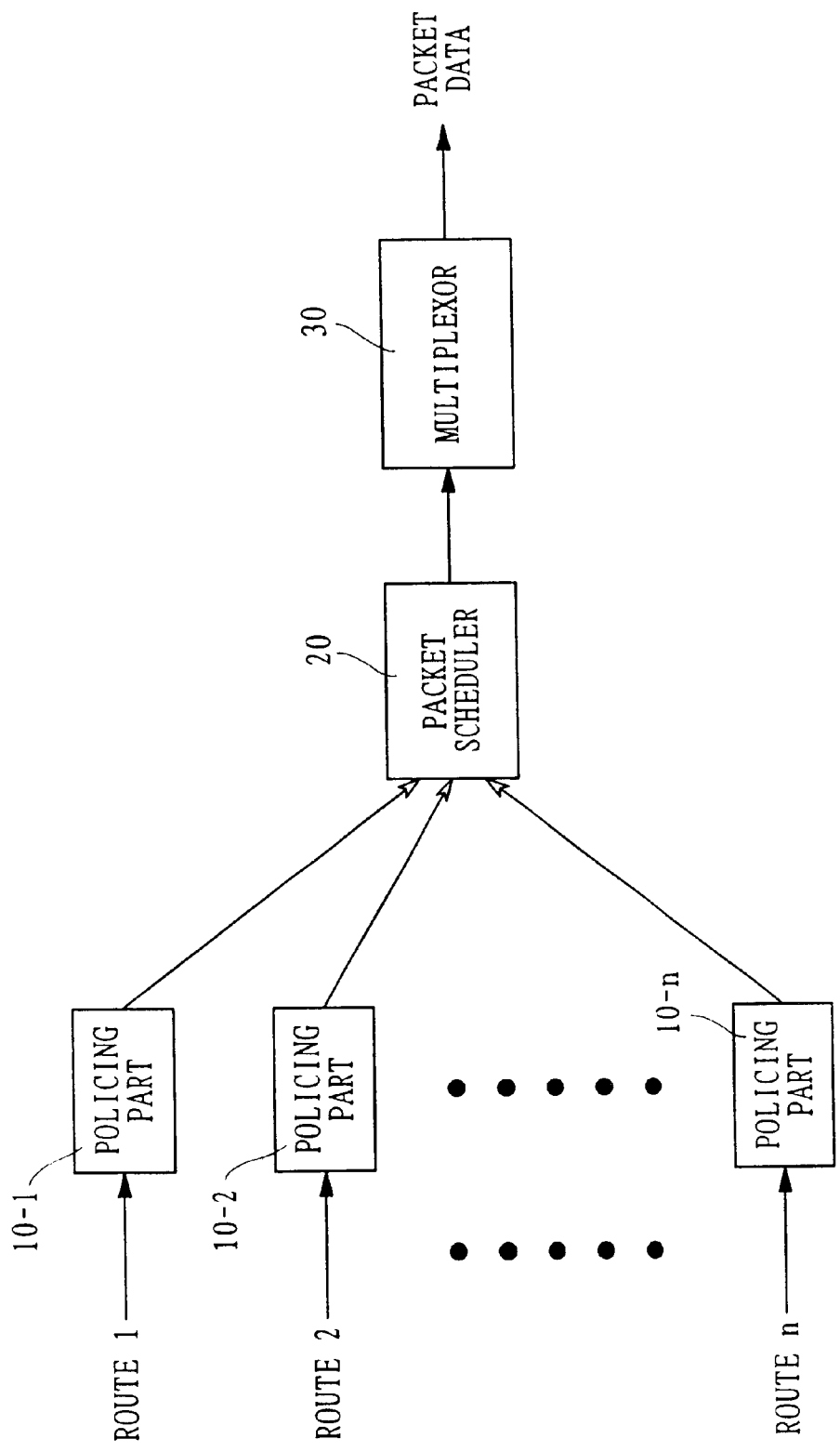
FIG. 2 is a block diagram illustrating a structure for employing a traffic control method for providing a predictive/guaranteed service according to the present invention.

FIG. 2 is a block diagram illustrating a structure for employing the traffic control method for providing the predictive/guaranteed service according to the present invention, including a plurality of policing units 10-1~10-n for observing an average transmission rate of traffic data inputted through a plurality of routes 1~n, namely packet data consisting of packets, and for transmitting the packet data when passing conditions for the packet data are satisfied; a packet scheduler 20 for determining a passing order of the packet data passed through the policing units 10-1~10-n according to a predetermined rule; and a multiplexor 30 for multiplexing the packet data selected by the packet scheduler 20 and for transmitting the packet data to a receiving side through a single transmission route.

However, in order to support the predictive service, it should be considered to properly guarantee the quality of service QOS and to effectively utilize resources. When the guaranteed service is provided, the routes should be completely isolated from one another in order to satisfy the complete quality of service QOS. Accordingly, the present invention simultaneously supports a tight call-level isolation function and a loose packet-level isolation function.

Here, the tight call-level isolation implies that an average transmission rate is maintained, not influenced by a volume of traffics of the other routes sharing an identical physical line. The loose packet-level isolation implies that an order of transmitting the packets is less important.

How strictly the average transmission rate is observed is important in the call-level isolation. According to the present invention, the call-level isolation is supported through the policing units 10-1~10-n by using an moving ceiling MC method, and the loose packet-level isolation is supported by using the first in first out FIFO or weighted fair queueing WFQ method in the packet scheduler 20.

In the packet scheduler 20, the packet data transmitted from the policing units 10-1~10-n are outputted to the multiplexor 30 through an weight assigned to each packet data according to a priority order of the predetermined packet data, namely a maximum value of a time to be serviced, thereby providing a service to the receiving side.

Embodiments of the present invention will now be described with reference to FIGS. 3 and 4.

First, the MC method is a kind of policing or ushe parameter control UPC methods which are often used in an ATM traffic control method. Thus, the MC method is not limitative of an ATM cell, but applicable to a normal packet.

According to the MC method, whether the traffic is transmitted according to a predetermined traffic property is observed, and the packets are partially abandoned or attached with a tag in the case that the traffic is not transmitted pursuant to the predetermined property.

The average traffic transmission rate is observed by the MC method. For example, when it is presumed that a predetermined traffic property is that ten packets are passed in a minute, in case only five packets are inputted in a minute, the packets more than the average are allowed in a next minute because fewer packets than the average are inputted. Also when many packets are inputted, the packets less than the average are inputted in a next minute.

Here, one minute is a kind of window indicating a time interval of determining after observing the traffic.

In the case that too many or less traffics are inputted, it cannot be unlimitedly allowed. Accordingly, buffers are required to solve such a problem. That is, when the buffer is five, if the packets more than five are entered, next succeeding packets are abandoned.

Figure 3:
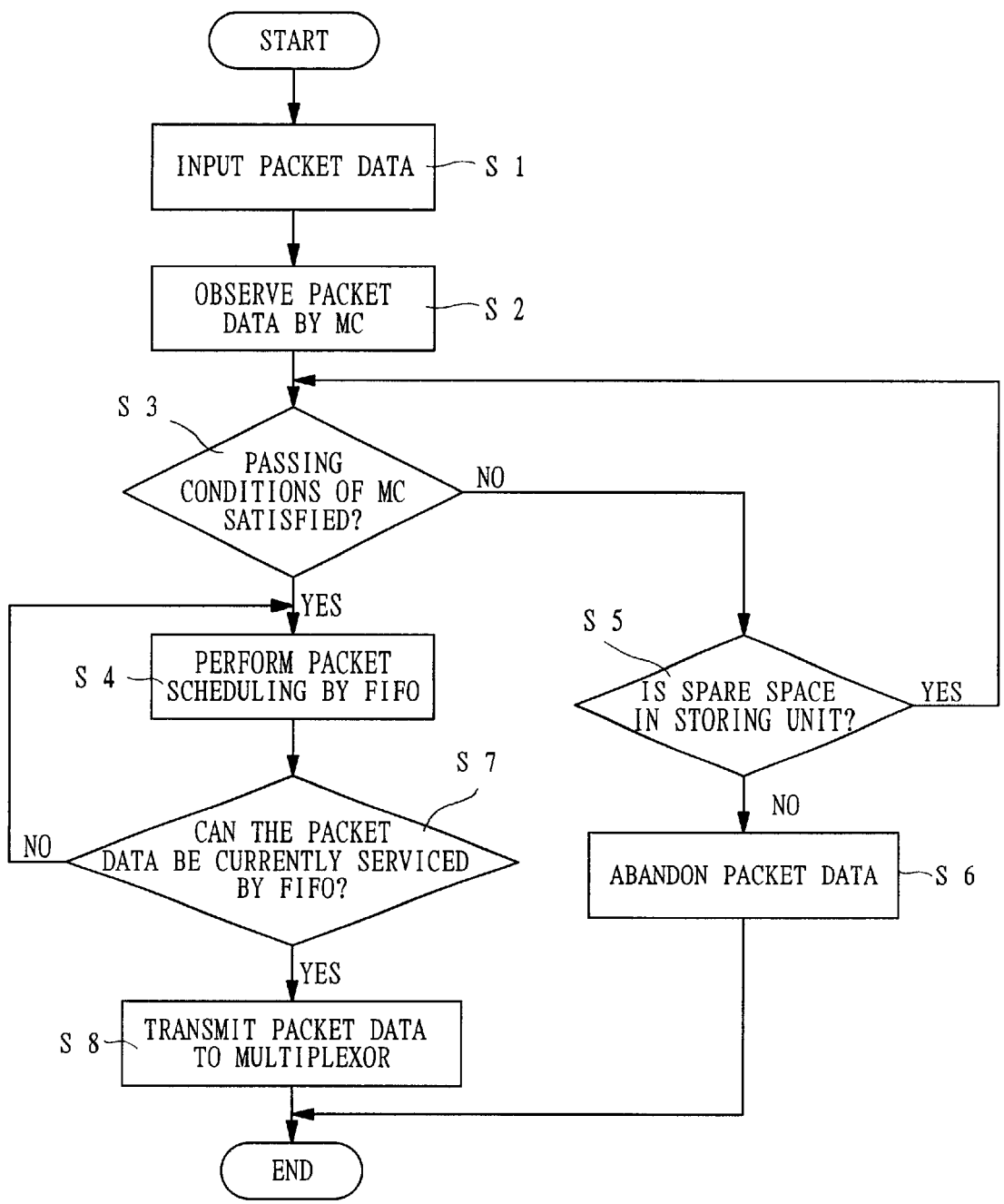
FIG. 3 is a flowchart of the traffic control method for providing a predictive service according to the present invention.

FIG. 3 illustrates a traffic control method of the packet data in a structure for supporting the predictive service according to the first embodiment of the present invention.

Here, the FIFO is a method of transmitting the packets in an input order, regardless of the input routes of the packets.

First, different traffic data inputted through each route 1~n, namely the packet data consisting of the packets are inputted to the policing units 10-1~10-n(S1).

Then, the average transmission rate of the packet data by each input route is observed by using the MC method in the policing units 10-1~10-n(S2).

After observing a number of the packet data to be passed for a predetermined time in the above step(S2), whether the packet data satisfies the passing conditions of the MC method is determined(S3).

In the case that the inputted packet data satisfies the passing conditions of the MC method, an output order is determined in the input order by the packet scheduler 20 of the FIFO method. When the packet data does not satisfy the passing conditions, whether art spare space exists in the certain storing unit is determined(S5). When there is the empty space, the packet data on each route is temporarily stored therein, and returned to the above step(S3). In case there is no empty space, the packet data is abandoned(S6).

Here, when the packet data does not satisfy the passing conditions, the packet data is temporarily stored in the certain storing unit so as to be transmitted in a next window because it fails to be transmitted in the current window.

In performing the packet scheduling of the packet scheduler 20 by the FIFO method in the above step(S4), whether the packet data on the corresponding route can be currently serviced is determined(S7).

When the packet data on the corresponding route can be currently serviced in the above step(S7), the packet data are transmitted to the multiplexor 30 in the input order, and transmitted through the single transmission route(S8). When the packet data cannot be currently serviced, it is returned to the above step(S4), and the packet scheduling is carried out again thereon.

Figure 4:
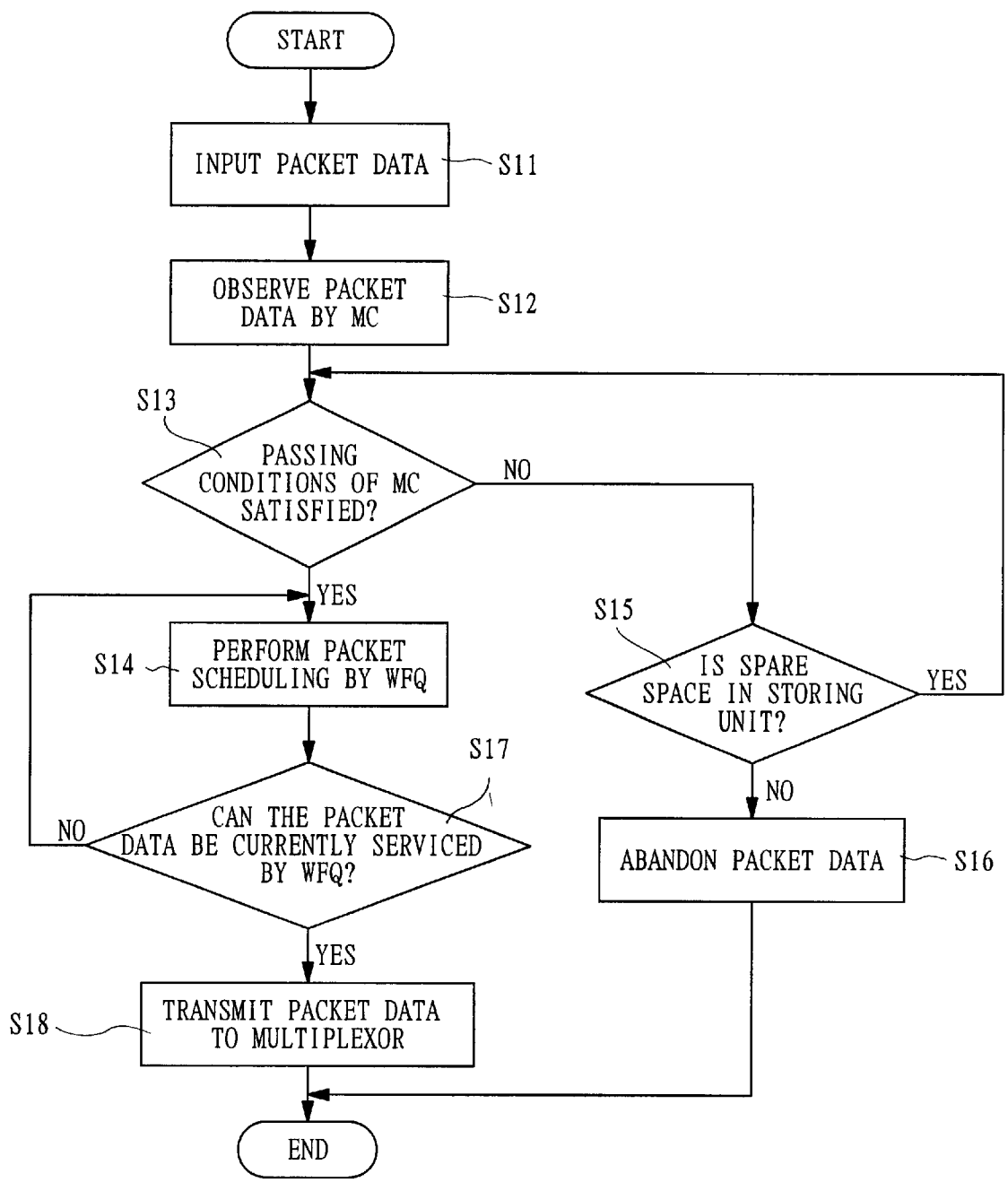
FIG. 4 is a flowchart of the traffic control method for providing a guaranteed service according to the present invention.

FIG. 4 illustrates a traffic control method of the packet data in a structure supporting the guaranteed service according to a second embodiment of the present invention.

Here, the WFO is a method of providing an weight to each input route and determining a volume of the packets to be passed according to the weight.

First, different traffic data inputted through each route 1~n, namely the packet data consisting of the packets are inputted to the policing units 10-1~10-n(S11).

Then, the average transmission rate of the packet data by each input route is observed by using the MC method in the policing units 10-1~10-n(S12).

After observing a number of the packet data to be passed for a predetermined time in the above step(S12), whether the packet data satisfies the passing conditions of the MC method is determined(S13).

In the case that the inputted packet data satisfies the passing conditions of the MC method, the packet data on each route are transmitted to the packet scheduler 20 and the packet scheduling of the packet scheduler 20 is carried out thereon by the WFQ method(S14). When the packet data does not satisfy the passing conditions, whether an spare space exists in the certain storing unit is determined(S15). When there is the empty space, the packet data on each route is temporarily stored therein, and returned to the above step(S13). In case there is no empty space, the packet data is abandoned(S16).

In performing the packet scheduling of the packet scheduler 20 by the WFQ method in the above step(S14), whether the packet data can be currently serviced is determined according to weight conditions provided to each input route(S17).

When the packet data to be transmitted to the packet scheduler 20 can be currently serviced in the above step (S17), the packet data are transmitted to the multiplexor 30 in the input order, and transmitted through the single transmission route(S18). When the packet data cannot be currently serviced, it is returned to the above step(S14), and the packet scheduling by the WFQ method is carried out again thereon.

The passing conditions of the MC method according to the first and second embodiments of the present invention implies that, when it is presumed that a number of the packets allowed to be passed in each window is A, a number of the packets stored by a history of previous windows (a volume of the traffics which have been transmitted) is B (namely when fewer packets are inputted), a number of the packets used by borrowing by the previous history is C (namely when the packets more than the average are passed), and a size of a buffer for reducing a change is D, in the condition that a new window (w) is started and 'a' packets are currently passed, if a new packet is inputted, the packet is passed when 'A+B+D−a' is greater than '0' (A+B+D−a>0) in the case that the packets less than the average by B are inputted, and the packet is passed when 'A−C+D−a' is greater than '0' (A−C+D−a>0) in the case that the packets more than the average by C are inputted.

On the other hand, the FIFO and WFO methods of the present invention are included in the scheduler for determining the passing order of the inputted packets in the multiplexor.

As discussed earlier, the present invention can effectively support the predictive/guaranteed service by controlling the transmission routes of the various traffic data by simultaneously employing the policing function using the MC method supporting the tight call-level isolation and the packet scheduling function using the FIFO or WFO method supporting the loose packet-level isolation, and especially reduce the processing time of the packet data by using the MC method.

What is claimed is:

1. In a structure including a plurality of policing units for observing packet data inputted through a plurality of routes and for transmitting the packet data satisfying passing conditions; a packet scheduler for transmitting the packet data passed through the policing units in an input order, and a multiplexor for multiplexing the packet data selected by the packet scheduler and transmitting the packet data to a receiving side through a single transmission route, a traffic control method for providing a predictive service, comprising:

a first step of observing an average transmission rate of the packet data inputted through each input route by using a moving ceiling MC method in the policing units;

a second step of determining whether the packet data satisfies the passing conditions of the MC method by a result of the observation;

a third step of transmitting the packet data on each route to the packet scheduler and determining a multiplexing order of the packet data by the packet scheduler of a first in first out FIFO method when the packet data satisfies the passing conditions of the MC method;

a fourth step of storing the packet data in a certain storing unit and trying to transmit the packet data again in a next window or abandoning the packet data when there is no empty space in the storing unit, in the case that the packet data does not satisfy the passing conditions of the MC method;

a fifth step of determining whether the packet data on the corresponding route can be currently serviced, in performing the packet scheduling by the FIFO method in the third step; and a sixth step of transmitting the packet data to the multiplexor in the input order when the packet data on the corresponding route can be currently serviced in the fifth step, and returning to the third step and carrying out the packet scheduling by the FIFO method again when the packet data cannot be currently serviced.

2. In a structure including a plurality of policing units for observing packet data inputted through a plurality of routes and for transmitting the packet data satisfying passing conditions; a packet scheduler for transmitting the packet data passed through the policing units in a priority order according to a predetermined service time, and a multiplexor for multiplexing the packet data selected by the packet scheduler and transmitting the packet data to a receiving side through a single transmission route, a traffic control method for providing a guaranteed service, comprising:

a first step of observing an average transmission rate of the packet data inputted through each input route by using a moving ceiling MC method in the policing units;

a second step of determining whether the packet data satisfies the passing conditions of the MC method by a result of the observation;

a third step of transmitting the packet data on each route to the packet scheduler and carrying out the packet scheduling thereon by an weighted fair queueing WFQ method when the inputted packet data satisfies the passing conditions of the MC method;

a fourth step of storing the packet data in a certain storing unit and trying to transmit the packet data again in a next window or abandoning the packet data when there is no empty space in the storing unit, in the case that the packet data does not satisfy the passing conditions of the MC method;

a fifth step of determining whether the packet data on the corresponding route can be currently serviced according to weight conditions provided to each input route, in performing the packet scheduling by the WFQ method in the third step; and a sixth step of transmitting the packet data to the multiplexor when the packet data transmitted to the packet scheduler can be currently serviced in the fifth step, and returning to the third step and carrying out the packet scheduling by the WFQ method again when the packet data cannot be currently serviced.

* * * * *